(12) United States Patent
Balakrishnan et al.

(10) Patent No.: US 11,893,815 B2
(45) Date of Patent: Feb. 6, 2024

(54) SYSTEMS AND METHODS FOR GENERATING SEARCH RESULTS BASED ON OPTICAL CHARACTER RECOGNITION TECHNIQUES AND MACHINE-ENCODED TEXT

(71) Applicant: Yahoo Assets LLC, Dulles, VA (US)

(72) Inventors: Vinod Balakrishnan, Fremont, CA (US); Xiaoyu Guo, Sunnyvale, CA (US)

(73) Assignee: Yahoo Assets LLC, New York, NY (US)

( * ) Notice: Subject to any disclaimer, the term of this patent is extended or adjusted under 35 U.S.C. 154(b) by 0 days.

(21) Appl. No.: 18/146,024

(22) Filed: Dec. 23, 2022

(65) Prior Publication Data

US 2023/0126412 A1    Apr. 27, 2023

Related U.S. Application Data

(63) Continuation of application No. 17/808,157, filed on Jun. 22, 2022, now Pat. No. 11,562,586, which is a continuation of application No. 16/657,201, filed on Oct. 18, 2019, now Pat. No. 11,398,099.

(51) Int. Cl.
| | |
|---|---|
| *G06V 30/148* | (2022.01) |
| *G06F 16/332* | (2019.01) |
| *G06F 16/338* | (2019.01) |
| *G06V 30/414* | (2022.01) |
| *G06V 30/10* | (2022.01) |
| *G06N 20/00* | (2019.01) |

(52) U.S. Cl.
CPC .......... *G06V 30/153* (2022.01); *G06F 16/332* (2019.01); *G06F 16/338* (2019.01); *G06N 20/00* (2019.01); *G06V 30/414* (2022.01); *G06V 30/10* (2022.01)

(58) Field of Classification Search
CPC .... G06V 30/153; G06V 30/414; G06V 30/10; G06F 16/332; G06F 16/338; G06N 20/00
See application file for complete search history.

(56) References Cited

U.S. PATENT DOCUMENTS

2020/0380598 A1\* 12/2020 Spector ............... G06V 30/418

\* cited by examiner

*Primary Examiner* — Christopher Wait
(74) *Attorney, Agent, or Firm* — Bookoff McAndrews, PLLC

(57) ABSTRACT

Disclosed are systems and methods for generating search result data based on machine-encoded text generated by computer vision optical character recognition machine learning techniques performed on digital media. The disclosed systems and methods provide a novel framework for performing machine learning visual search or machine learning text extraction techniques on digital media in order to extract and analyze the data therein and further conduct search queries based on the extracted and analyzed data. The disclosed framework may leverage the aforementioned computer vision machine learning techniques in order to provide a user with relevant search results regarding objects and text detect in digital media captured on a user device.

20 Claims, 6 Drawing Sheets

SYSTEMS AND METHODS FOR GENERATING SEARCH RESULTS BASED ON OPTICAL CHARACTER RECOGNITION TECHNIQUES AND MACHINE-ENCODED TEXT

CROSS-REFERENCE TO RELATED APPLICATION(S)

This patent application is a continuation of and claims the benefit of priority to U.S. Nonprovisional patent application Ser. No. 17/808,157, filed on Jun. 22, 2022, which is a continuation of U.S. application Ser. No. 16/657,201, now U.S. Pat. No. 11,398,099, filed on Oct. 18, 2019, the entireties of which are incorporated herein by reference.

TECHNICAL FIELD

The present disclosure relates to recognizing text and generating search results and, more specifically, to techniques for generating search result data based on machine-encoded text data generated by optical character recognition techniques performed on media.

BACKGROUND

The Internet is a valuable resource for providing users with information. User-initiated online search accounts for millions of daily queries and traffic for search engine providers. In particular, users leverage search engines to find information and make decisions among various online entities, such as websites, online merchants, online companies, or online services. In addition, many search engines are evolving into a type of informational utility that helps consumers make important decisions in their offline lives, as well, by providing services that help them manage more of their day-to-day offline activities and needs.

Online searching is a common way for users to locate information, goods, or services on the Internet. A user may use an online search engine to type in one or more keywords (also referred to as a search term or search query) to search for pages or web sites with information related to the keyword(s). A search engine may allow users to search for web pages or other materials accessible over the Internet with one or more search terms. After receiving a search request including one or more search terms identified by a user, a search engine may parse the search term(s) from the search request, identify web pages that may be related to the search term(s), and display on a result page information about the web pages as a list of search results, e.g., a link to a web page containing the search term(s). The search results may be ranked according to their relevance to the search terms, with the most relevant search result being positioned at the top of the list. The relevance may be determined according to search engine algorithms of a search engine service provider.

However, as the proliferation of brand, product, and service specific applications becomes increasing more prevalent, users are interacting with new forms of media and initiating native search queries in ways historical search engine techniques cannot address. Therefore, it may be desirable to provide a system and method directed to new techniques for performing native application search queries.

SUMMARY OF THE DISCLOSURE

Embodiments of the present disclosure include systems and methods for generating search result data based on machine-encoded text data generated by optical character recognition techniques performed on media.

According to certain embodiments, computer-implemented methods are disclosed for generating search result data based on machine-encoded text data generated by optical character recognition machine learning techniques performed on media. One method may include transmitting an image from a device search engine module to a device OCR machine learning module of a user device; receiving at the device search engine module machine-encoded text from the device OCR machine learning module; rendering a geometrical bounding element comprising the machine-encoded text, wherein the geometrical bounding element is overlaid onto the image; receiving a selection via a graphical user interface of at least a portion of the machine-encoded text corresponding to the geometrical bounding element; transmitting from the user device a search request comprising one or more of: a device identifier, a location of the user device, and a query comprising the portion of the machine-encoded-text, to a search application system; authenticating the received search request at the search application system via an API gateway and upon authenticating the search request, transmitting the search request to a server search engine module; searching for and identifying media and text data corresponding to the selected portion of the machine-encoded text; and receiving at the user device search results corresponding to the search request.

According to certain embodiments, systems are disclosed for generating search result data based on machine-encoded text data generated by optical character recognition machine learning techniques performed on media. One system may include at least one or more processors for transmitting an image from a device search engine module to a device OCR machine learning module of a user device; receiving at the device search engine module machine-encoded text from the device OCR machine learning module; rendering a geometrical bounding element comprising the machine-encoded text, wherein the geometrical bounding element is overlaid onto the image; receiving a selection via a graphical user interface of at least a portion of the machine-encoded text corresponding to the geometrical bounding element; transmitting from the user device a search request comprising one or more of: a device identifier, a location of the user device, and a query comprising the portion of the machine-encoded-text, to a search application system; authenticating the received search request at the search application system via an API gateway and upon authenticating the search request, transmitting the search request to a server search engine module; searching for and identifying media and text data corresponding to the selected portion of the machine-encoded text; and receiving at the user device search results corresponding to the search request.

According to certain embodiments, non-transitory computer readable medium are disclosed for generating search result data based on machine-encoded text data generated by optical character recognition machine learning techniques performed on media. One non-transitory computer readable medium may include at least one storage medium with instructions thereon for transmitting an image from a device search engine module to a device OCR machine learning module of a user device; receiving at the device search engine module machine-encoded text from the device OCR machine learning module; rendering a geometrical bounding element comprising the machine-encoded text, wherein the geometrical bounding element is overlaid onto the image; receiving a selection via a graphical user interface of at least a portion of the machine-encoded text corresponding to the geometrical bounding element; transmitting from the user device a search request comprising one or more of: a device identifier, a location of the user device, and a query comprising the portion of the machine-encoded-text, to a search application system; authenticating the received search request at the search application system via an API gateway and upon authenticating the search request, transmitting the search request to a server search engine module; searching for and identifying media and text data corresponding to the selected portion of the machine-encoded text; and receiving at the user device search results corresponding to the search request.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
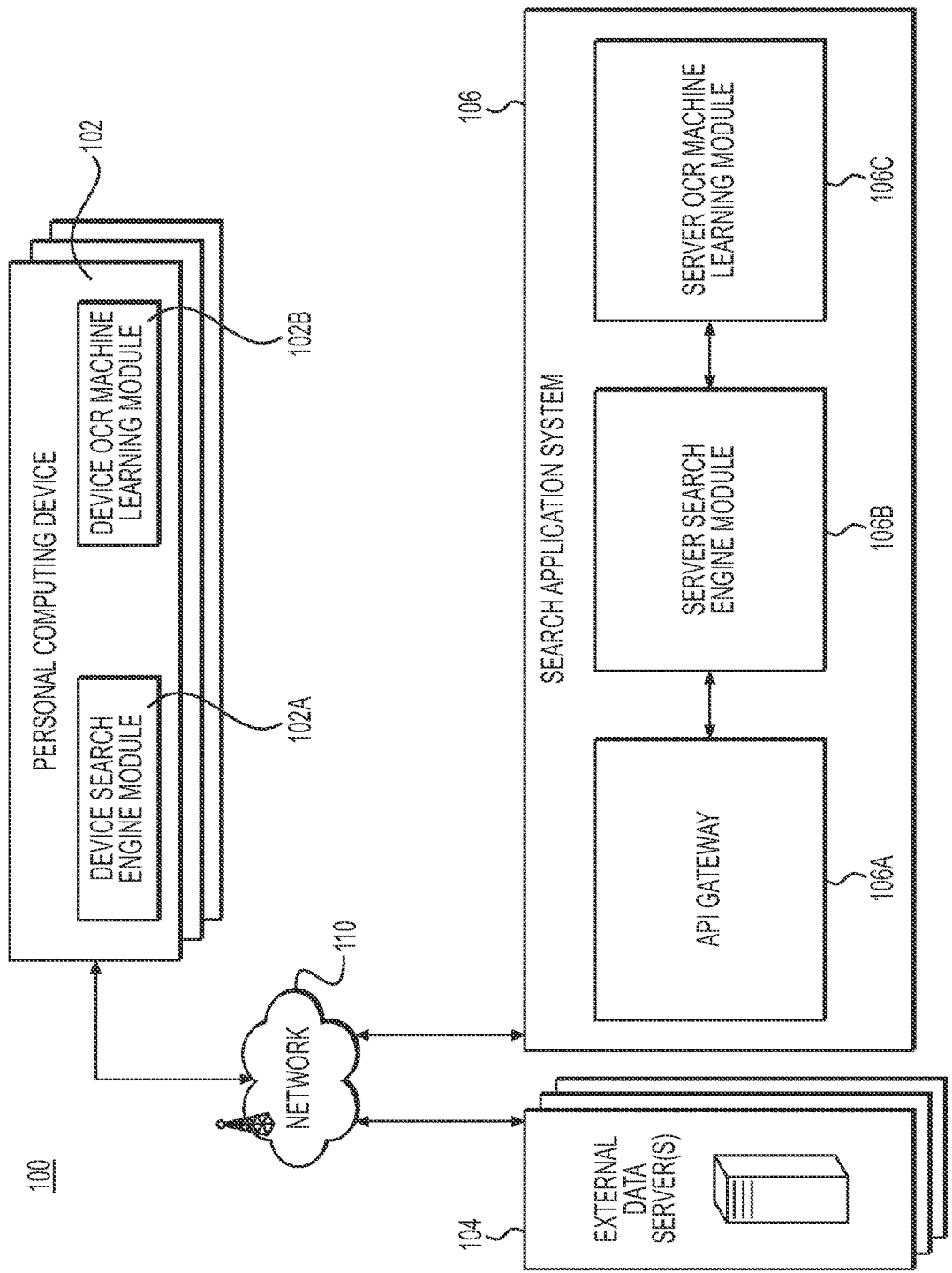
FIG. 1 depicts a schematic diagram illustrating an example of a computer network and environment within which the computer systems and methods disclosed herein are implemented according to some embodiments of the present disclosure.

While principles of the present disclosure are described herein with reference to illustrative embodiments for particular applications, it should be understood that the disclosure is not limited thereto. Those having ordinary skill in the art and access to the teachings provided herein, will recognize that the features illustrated or described with respect to one embodiment, may be combined with the features of another embodiment. Therefore, additional modifications, applications, embodiments, and substitution of equivalents, all fall within the scope of the embodiments described herein. Accordingly, the invention is not to be considered as limited by the foregoing description. Various non-limiting embodiments of the present disclosure will now be described to provide an overall understanding of the principles of the structure, function, and use of systems and methods for recommending where to conduct a for generating search result data based on machine-encoded text data generated by optical character recognition machine learning techniques performed on media.

As described above, as it pertains to providing search results based on media data, there is a need for systems and methods configured for generating search result data based on machine-encoded text data generated by optical character recognition machine learning techniques performed on media. Existing search engine techniques involve users submitting text-based search query to a search engine. For example, search engine techniques involve users submitting text-based search queries to a search engine (e.g. www.Yahoo.com), wherein links to websites related to the search queries are provided in response. These approaches lack techniques for performing searches based on media (e.g. images, video, or audio) and conducting said searches based on a search query derived from non-search engine content, e.g., from a brand/service specific application.

Accordingly, the present disclosure is directed to systems and methods for generating search result data based on machine-encoded text data generated by optical character recognition machine learning techniques performed on media. As discussed herein, a user is any individual who initiates a media-based search via applications. However, the concept of a user as disclosed herein is meant to be broad and encompass scenarios in which there may be one or more users, a user group, or a combination thereof, that access a search application system.

Thus, the present disclosure relates to techniques for enabling users to generate search queries by highlighting or otherwise selecting text recognized in images of physical media. For example, the techniques herein may enable a user to take a photo or video of any object or media containing text, recognize text in the photo or video, and enable the user to select and generate a search query from a subset of the recognized text by generating a display of the recognized text with one more user-selectable elements.

In one embodiment, for example, a media based search may be conducted by a user operating a user device who takes a picture of a menu at a restaurant via an application in attempt to search and gather relevant information about the items on the menu. In response, a device search engine module corresponding to the user device (i.e., a personal computing device) may locally transmit a digital image to a device OCR machine learning module. The device OCR machine learning module may optically recognize text and objects captured in the transmitted digital image and extract text information. The device OCR machine learning module may then render a geometrical bounding element comprising machine-encoded text representative of the extracted text information and transmit the geometrical bounding element comprising the machine-encoded text to the device search engine module. The user may then be presented with a graphical user interface wherein the digital image of the menu is now overlaid by a geometrical bounding element comprising machine-encoded text and wherein the user is provided a graphical user interface tool for selecting machine-encoded text in order to further perform a search to gather additional information regarding the selected machine-encoded text (i.e., one or more menu items). The user device then transmits a search request comprising one or more of: a device identifier, a location of the user device, and a query comprising the portion of the machine-encoded text over a network to a search application system. The search application system then authenticates the search request via an API gateway and upon authenticating the search request, locally transmit the search request to a server search engine module. The server search engine module initiates a search to identify media and text data corresponding to the selected portion of machine-encoded text. Upon identifying the media and text data corresponding to the selected portion of machine-encoded text, said media and text data are transmitted to the user device as a search result.

In general, any of the various steps of optically recognizing text, generating machine-encoded text and/or one or more user-selectable elements, and generating search query results may take place locally on the device that generated the images, or on one or more of various remote servers. Thus, in another embodiment, for example, a media based search may be conducted by a user operating a user device who takes a picture of a menu at a restaurant via an application in attempt to search and gather relevant information about the items on the menu. In response, a search application system may receive a device identifier, a location of the user device, and a digital image comprising text from a user device (i.e., a personal computing device) over network. A server OCR machine learning module located remotely from the device may then receive and optically recognize text and objects captured in the transmitted digital image and extract text information and further render a geometrical bounding element comprising machine-encoded text representative of the extracted text information and further transmit the geometrical bounding element comprising the machine-encoded text to the user device. The user may then be presented with a graphical user interface wherein the image of the menu is now overlaid with a geometrical bounding element comprising machine-encoded text and wherein the user is provided a graphical user interface tool for selecting machine-encoded text in order to further perform a search to gather additional information regarding the selected machine-encoded text (i.e. one or more menu items). The user device may then transmit a search request comprising at least the portion of the machine-encoded text over a network to a search application system. The search application system may then authenticate the search request via an API gateway and upon authenticating the search request, locally transmit the search request to a server search engine module. The server search engine module initiates a search to identify media and text data corresponding to the selected portion of machine-encoded text. Upon identifying the media and text data corresponding to the selected portion of machine-encoded text, said media and text data are transmitted to the user device as a search result.

FIG. 1 depicts a schematic diagram illustrating an example of a computer network and environment within which the computer systems and methods disclosed herein are implemented according to some embodiments of the present disclosure. As shown in FIG. 1, computing environment 100 may include a plurality of personal computing devices 102, external data server(s) 104, and a search application system 106, all in communication with one another via a network 110, such as the Internet.

The personal computing device 102 may include one or more of any desktop or portable computing device capable of receiving and sending a message over a network, such as network 110, or the like. For example, a personal computing device 102 may be a mobile phone, a desktop computer, a laptop computer, a landline phone, a gaming system, a television, smart accessory, and/or a digital or artificial intelligence enabled personal assistant.

As shown in FIG. 1, personal computing device 102 may optionally comprise a device search engine module 102A and/or a device OCR machine learning module 102B. Personal computing devices 102 may include any portable computing device capable of connecting to another computing device and receiving information, as discussed above. Personal computing devices 102 may also be configured to execute at least one native or web-based client application (e.g., a communication application) that is configured to receive communication and/or content from another computing device. In some embodiments, mobile devices (e.g., a mobile phone) may also communicate with non-mobile personal computing services (e.g., a smart speaker or smart home hub), or the like. In one embodiment, such communications may include accessing the Internet with or without an application, sending and/or receiving messages or voice/video calls, searching for, viewing, and/or sharing photographs, digital images, audio clips, video clips, or any of a variety of other forms of communications. Personal computing devices 102 may be configured for sending or receiving signals, such as via a wired or wireless network, or may be configured for processing or storing signals, such as in memory as physical memory states, and may, therefore, operate as a server. Network 110 may be configured to couple personal computing devices 102 and their components with components corresponding to the search application system 106. It should be appreciated that any devices or servers of FIG. 1 may be configured to communicate with each other directly, such as through Bluetooth or any other near-field communication (NFC) protocol. Network 110 may include any of a variety of wireless sub-networks that may further overlay stand-alone ad-hoc networks, and the like, to provide an infrastructure-oriented connection for the personal computing devices 102.

Device search engine module 102A may be a software module configured to receive and capture various media (e.g., a digital image, audio, or video) on a personal computing device 102. In response to receiving a digital image from the device search engine module 102A, the device OCR machine learning module 102B may recognize any captured text and transmit a geometrical boundary element comprising machine-encoded text to the device search engine module 102A. The device search engine module 102A may then receive a selection of a portion of the machine-encoded text from a user interaction with a graphical user interface displaying the machine-encoded text and further generate instructions for a query (representative of the selected portion of the machine-encoded text) requesting external information. The device search engine module 102A may then identify a device identifier (e.g., a phone number, device serial number, device IMEI number, IP address, user name, user profile, or the like); determine a location of the user device via a GPS system; and transmit a search request comprising one or more of: the device identifier, determined location, and the query comprising the portion of the machine-encoded text, to the search application system 106.

Device OCR machine learning module 102B may be a software module configured to receive various media (e.g., a digital image, audio, or video) captured and/or received by the device search engine module 102A. The device OCR machine learning module 102B may be further configured to label various media, detect and extract objects, barcodes, faces, textual data, on various media (e.g., a digital image, audio, or video). The device OCR machine learning module 102B may be further configured to implement certain natural language processing techniques, for example: spell checking, keyword search, finding synonyms, extracting information from websites such as: product price, dates, location, people, or company names, classifying: reading level of school texts, positive/negative sentiment of longer documents, machine translation, spoken dialog systems, complex question answering, and translating between languages. In an instance wherein the device OCR machine learning module 102B receives a digital image comprising text, the device OCR machine learning module 102b may optically recognize said text on the digital image and render a geometrical boundary element comprising machine-encoded text which is representative of the optically recognized text. The device OCR machine learning module 102B may then transmit the rendered geometrical boundary comprising the portion of the machine-encoded text to the device search engine module 102A.

In general, network 110, may include local area networks ("LANs")/wide area networks ("WANs") network, wireless network, or any combination thereof, and configured to implement protocols for transmitting data in communication computing devices accessing the search application system 106. Not all the components featured in FIG. 1 may be required to practice the disclosure, and variations in the arrangement and type of the components may be made without departing from the spirit or scope of the disclosure.

The external data server(s) 104 may include one or more of personal computers desktop computers, multiprocessor systems, microprocessor-based or programmable consumer electronics, database(s), network PCs, server(s), and the like, maintained by third parties storing business-to-business or business-to-consumer data (e.g., Verizon®, Yelp®, TripAdvisor®, Foursquare®, Ctrip®, Zagat®, Google®, Facebook®, Instagram®, or the like). The search application system 106 may receive data stored on the external data server(s) 104 on one or more of its computing devices. The data stored at the external data server(s) 104 may include, but is not limited to, information related to: business location information, business menu information, pricing, service cost, inventory, business reviews, rich card information, seating availability, seating arrangements, rewards information, weather, news, transportation (e.g., public and private data related to airplanes, rocket ships, trains, and aquatic vehicles), mobile devices (e.g., iPhone®), smart accessories (e.g. Apple Watch®), artificial intelligence enabled devices (e.g. Alexa®, Google Home®, Facebook Portal®, and the like), and GPS data corresponding to a user or a personal computing device 102. For example, the search application system 106 may receive or may be able to parse data from the external data server(s) 104 pertaining to specific user(s) interests or preferences on Yelp® or TripAdvisor® and IP addresses associated with personal computing devices receiving engaging with the service; information regarding user(s) data collected by artificial intelligence personal assistants (e.g., ordering habits, user-to-user communication, reminders, user queries, and the like); personal computing device information (e.g., device signal strength, number and type of applications on the device, SIM/eSIM data, IMEI information, data stored in the cloud corresponding to the device, internet based user queries, and the like); and banking information (e.g., account balance, credit history, debt information, and the like).

The search application system 106 may be further comprised of an API gateway 106A, server search engine module 106b, and a server OCR machine learning module 106C. Although not shown, the search application system 106 may further be comprised of one or more databases and servers (communication servers, web servers, application servers, proxy servers, collaboration server, or the like). The search application system 106 may be configured to execute one or more media analysis software modules (not shown) based on instructions and data stored in one or more databases. The databases may be any type of database or memory, and may be configured to be in direct communication with the search application system 106.

The API gateway 106A may be configured to communicate with one or more network 110 components and or server components to manage initial communications for API calls from applications. The API gateway 106A may be further configured to verify that API requests meet predetermined policy and security controls for search application system 106. For example, API gateway 106A may be configured to provide instructions for search application system 106 server components to screen requests for malicious input and issue tokens to applications that are used to balance API workloads. API gateway 106A may also receive load/capacity information from devices in communication with the search application system 106, for example, network routers (not shown) and/or load balancers (not shown).

Server search engine module 106b may be a software module configured to receive and capture various media (e.g. a digital image, audio, or video) from a personal computing device 102. For example, the device search engine module 106A may detect a new picture in a user device (i.e., personal computing device 102) camera roll or the device search engine module 106A may provide a graphical user interface for capturing an image within an application. In response to receiving a digital image from the personal computing device 102, the server search engine module 106b may transmit the received digital image to the server OCR machine learning module 106C, and the server OCR machine learning module 106C may transmit a geometrical boundary element comprising machine-encoded text to the server search engine module 106B. The device search engine module 102B may detect a digital image automatically (e.g., in a camera roll, user device database, or graphical user interface) and initiate the step of transmitting the digital image to the server OCR machine learning module 106C without detection of input on a graphical user interface. The server search engine module 106b may then receive a selection of a portion of the machine-encoded text from a user interaction with a graphical user interface displaying the machine-encoded text and further generate instructions for a query (representative of the selected portion of the machine-encoded text) requesting external information. The server search engine module 106B may then identify a device identifier (e.g., a phone number, device serial number, device IMEI number, IP address, user name, user profile, or the like); determine a location of the user device via a GPS system; and implement a search request comprising one or more of: the device identifier, determined location, and the query comprising the portion of the machine-encoded text, via search application system 106 components or externally to a cloud search service 208.

Server OCR machine learning module 106C may be a software module configured to receive various media (e.g., a digital image, audio, or video) captured and/or received by the device search engine module 102A or a received by server search engine module 106B. The server OCR machine learning module 106C may be further configured to label various media, detect and extract objects, barcodes, faces, textual data, on various media (e.g., a digital image, audio, or video). The server OCR machine learning module 106C may be further configured to implement certain natural language processing techniques, for example: spell checking, keyword search, finding synonyms, extracting information from websites such as: product price, dates, location, people, or company names, classifying: reading level of text, positive/negative sentiment of documents, machine translation, spoken dialog systems, complex question answering, and translating between languages. In an instance wherein the server OCR machine learning module 106C receives a digital image comprising text, the server OCR machine learning module 106C may optically recognize said text on the digital image and render a geometrical boundary element comprising machine-encoded text which is representative of the optically recognized text. The server OCR machine learning module 106C may then transmit the rendered geometrical boundary comprising the portion of the machine-encoded text representative of the optically recognized text to the device search engine module 102A or the server search engine module 1066.

It should be appreciated that personal computing device 102 may function as a "thin" client that captures images to be processed remotely, or alternatively may function as a "thick" client that performs most or all of the steps of image processing, text recognition, and searching, locally. Thus, in some embodiments, the steps of generating of search queries and initiating searching either locally or via third-party APIs may be conducted locally, e.g., on the device search engine module 102A, or remotely, e.g., on the sever search engine module 106B. Similarly, the steps of identifying text and generating selectable machine-readable text from which search queries are constructed may be performed locally, e.g., on the device OCR machine learning module 102B, or remotely, e.g., on the server OCR machine learning module 106C. Thus, any or all of device search engine module 102A, device OCR machine learning module 1026, server search engine module 1066, and server OCR machine learning module 106C may be thought of as optional or replaceable by each other or remote services, as desired. To that end, FIG. 2 depicts an example of a thick-client scenario in which OCR and search steps are initiated or conducted on a personal computing device 202, whereas FIG. 3 depicts an example of a thin-client scenario in which OCR and search steps are initiated or conducted on a remotely-located search application system 306.

Figure 2:
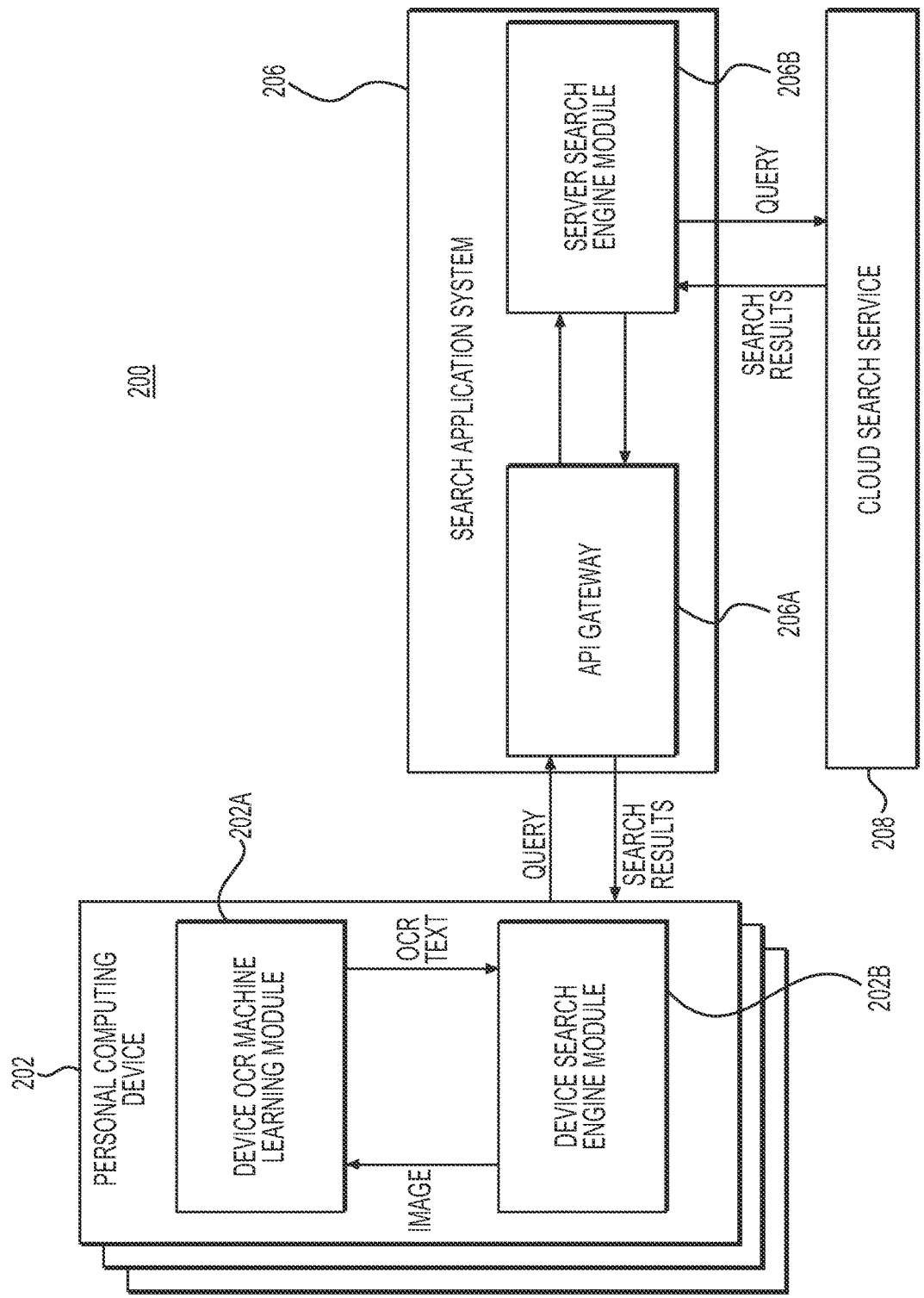
FIG. 2 depicts a block diagram illustrating data flow and various computer system modules for generating search result data based on machine-encoded text data generated by optical character recognition machine learning techniques performed on media.
Figure 3:
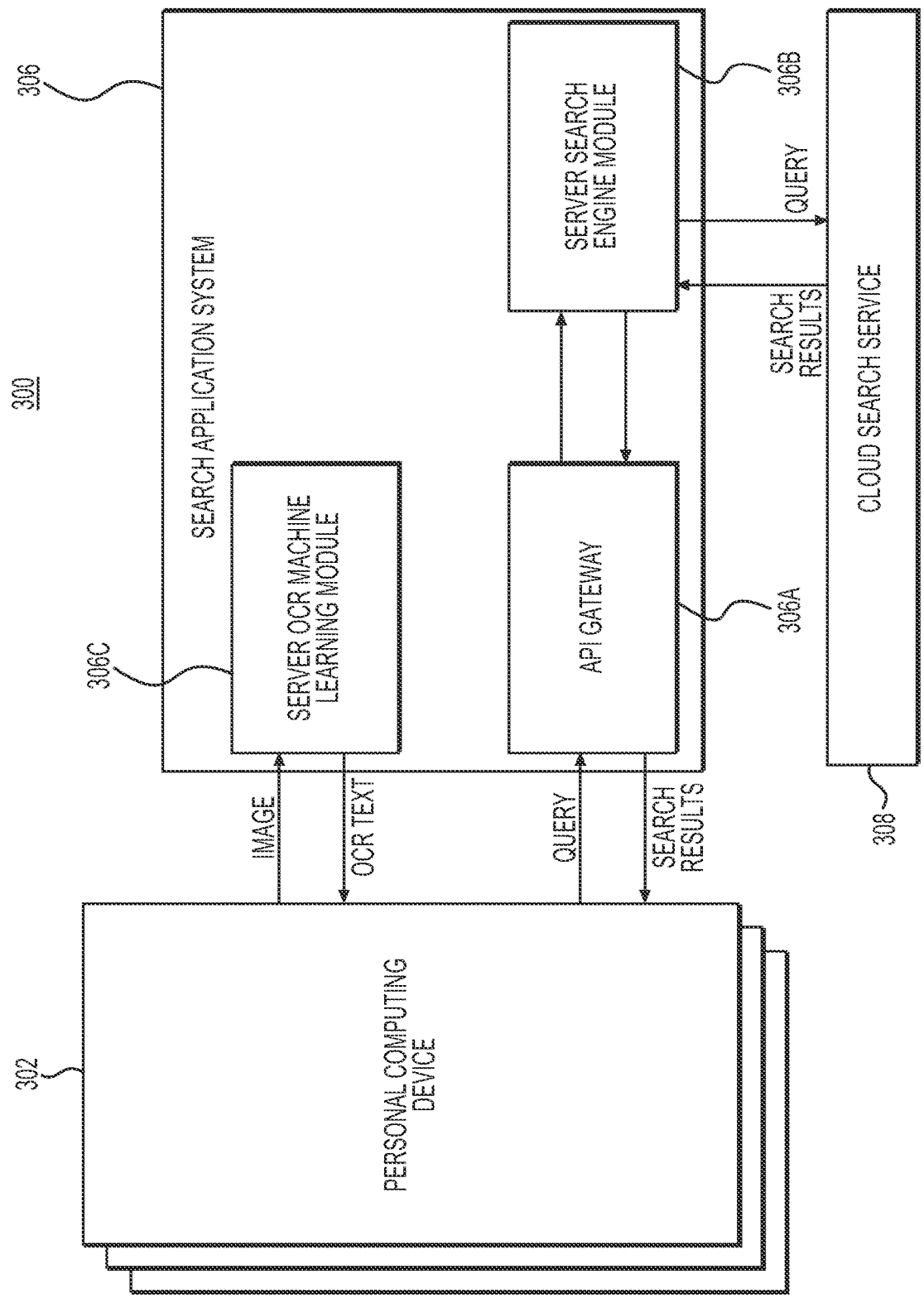
FIG. 3 depicts a block diagram illustrating alternative computer system modules for generating search result data based on machine-encoded text data generated by optical character recognition machine learning techniques performed on media.

FIG. 2 depicts a block diagram illustrating data flow and various computer system modules for generating search result data based on machine-encoded text data generated by optical character recognition machine learning techniques performed on media. Computing environment 200 further depicts systems and methods for generating search result data based on machine-encoded text data, wherein captured media is analyzed via OCR machine learning techniques locally on one or more personal computing devices 202 as opposed to requesting the analysis be performed externally or remotely. Computing environment 200 may be comprised of one or more personal computing devices 202, a search application system 206, and cloud search service 208.

Personal computing device 202 may include one or more of any desktop or portable computing device capable of receiving and sending a message over a network, such as network 110, or the like. For example, a personal computing device 202 may be a mobile phone, a desktop computer, a laptop computer, a landline phone, a gaming system, a television, smart accessory, and/or a digital or artificial intelligence enabled personal assistant. Personal computing device 202 may further comprise of a device search engine module 202B and device OCR machine learning module 202A. Personal computing devices 202 may include any portable computing device capable of connecting to another computing device and receiving information, as discussed above. Personal computing devices 202 may also be configured to execute at least one native or web-based client application (e.g., a communication application) that is configured to receive communication and/or content from another computing device. In some embodiments, mobile devices (e.g., a mobile phone) may also communicate with non-mobile personal computing services (e.g., a smart speaker or smart home hub), or the like. In one embodiment, such communications may include accessing the internet with or without an application, sending and/or receiving messages or voice/video calls, searching for, viewing, and/or sharing photographs, digital images, audio clips, video clips, or any of a variety of other forms of communications. Personal computing devices 202 may be configured for sending or receiving signals, such as via a wired or wireless network, or may be configured for processing or storing signals, such as in memory as physical memory states, and may, therefore, operate as a server. Network 110 may be configured to couple personal computing devices 202 and their components with components corresponding to the search application system 206. It should be appreciated that any devices or servers of FIG. 2 may be configured to communicate with each other directly, such as through Bluetooth or any other near-field communication (NFC) protocol. Network 110 may include any of a variety of wireless sub-networks that may further overlay stand-alone ad-hoc networks, and the like, to provide an infrastructure-oriented connection for the personal computing devices 202. Personal computing device 202 may be configured to capture digital media (e.g. a digital image) locally, and further analyze the digital media locally via OCR machine learning techniques on the one or more personal computing devices 202 as opposed to requesting the analysis be performed externally at the search application system 206. For example, a user device may capture a digital image of a restaurant menu, wherein the device search engine module 202B would transmit the digital image locally on the user device to the device OCR machine learning module 202A. The device OCR machine learning module 202A may then render and transmit a geometrical boundary element comprising machine-encoded text which is representative of the optically recognized text captured in the digital image. The user may then be presented with a graphical user interface wherein the digital image of the menu is now overlaid with the geometrical bounding element comprising machine-encoded text and wherein the user is provided a graphical user interface tool for selecting machine-encoded text in order to further perform a search to gather additional information regarding the selected machine-encoded text (i.e. one or more menu items). The device search engine module 202B may then identify a device identifier (e.g. a phone number, device serial number, device IMEI number, IP address, user name, user profile, or the like); determine a location of the user device via a GPS system; and transmit a search request comprising one or more of: the device identifier, determined location, and the query comprising the portion of the machine-encoded text, to the search application system 206. The search application system may then conduct a search based on the received search request and transmit search results back to the personal computing device 202.

Device search engine module 202B may be a software module configured to receive and capture various media (e.g. a digital image, audio, or video) on a personal computing device 202. In response to receiving a digital image from the device search engine module 202B, the device OCR machine learning module 202A may transmit a geometrical boundary element comprising machine-encoded text to the device search engine module 202B. The device search engine module 202B may then receive a selection of a portion of the machine-encoded text from a user interaction with a graphical user interface displaying the machine-encoded text and further generate instructions for a query (representative of the selected portion of the machine-encoded text) requesting external information. The device search engine module 202B may then identify a device identifier (e.g. a phone number, device serial number, device IMEI number, IP address, user name, user profile, or the like); determine a location of the user device via a GPS system; and transmit a search request comprising one or more of: the device identifier, determined location, and the query comprising the portion of the machine-encoded text, to the search application system 206.

Device OCR machine learning module 202A may be a software module configured to receive various media (e.g. a digital image, audio, or video) captured and/or received by the device search engine module 202B. The device OCR machine learning module 202A may be further configured to label various media, detect and extract objects, barcodes, faces, textual data, on various media (e.g. a digital image, audio, or video). The device OCR machine learning module 202A may be further configured to implement certain natural language processing techniques, for example: spell checking, keyword search, finding synonyms, extracting information from websites such as: product price, dates, location, people, or company names, classifying: reading level of school texts, positive/negative sentiment of longer documents, machine translation, spoken dialog systems, complex question answering, and translating between languages. In an instance wherein the device OCR machine learning module 202A receives a digital image comprising text, the device OCR machine learning module 202A may optically recognize said text on the digital image and render a geometrical boundary element comprising machine-encoded text which is representative of the optically recognized text. The device OCR machine learning module 202A may then transmit the rendered geometrical boundary element comprising the portion of the machine-encoded text to the device search engine module 202B.

Search application system 206 may be comprised of an API gateway 206A, server search engine module 206B. Although not shown, the search application system 206 may further be comprised of one or more databases and servers (communication servers, web servers, application servers, proxy servers, collaboration server, or the like). The search application system 206 may be configured to execute one or more media analysis software modules (not shown) based on instructions and data stored in one or more databases. The databases may be any type of database or memory, and may be configured to be in direct communication with the search application system 206.

The API gateway 206A may be configured to communicate with one or more network components and or server components to manage initial communications for API calls from applications. The API gateway 206A may be further configured to verify that API requests from search requests initiated by personal computing devices 202 meet predetermined policy and security controls for search application system 106. For example, API gateway 206A may be configured to provide instructions for search application system 206 server components to screen requests for malicious input and issue tokens to applications that are used to balance API workloads. API gateway 206A may also receive load/capacity information from devices in communication with the search application system 206, for example, network routers (not shown) and/or load balancers (not shown).

Search engine module 206B may be a software module configured to receive and capture various media (e.g. a digital image, audio, or video) from a personal computing device 202. In response to receiving a search request, server search engine module 206B may implement several processes based on the instructions received in the search request. For example, upon receiving a device identifier (e.g. a phone number, device serial number, device IMEI number, IP address, user name, user profile, or the like) the server search engine module 206B may then determine the identity of a particular user (e.g. the user's given first and last name, social media user name, email address, or name associated with a billing statement). In response to receiving regarding the location of the user device via a GPS system the sever search engine module 206B may further make a determination that the user device is at particular address associated with a known location (e.g. a landmark, business, restaurant, commercial or personal property) and log the presence of the user device at that location in a database. In response to receiving a search query comprising the portion of the machine-encoded text, the server search engine module 206B may conduct an internal search query for the requested information associated with the selected portion of the machine-encoded text and/or transmit the query to a cloud search service 208.

FIG. 3 depicts a block diagram illustrating alternative computer system modules for generating search result data based on machine-encoded text data generated by optical character recognition machine learning techniques performed on media. Computing environment 300 further depicts systems and methods for generating search result data based on machine-encoded text data, wherein captured media is analyzed via OCR machine learning techniques at a search application system 306, as opposed being analyzed locally on one or more personal computing devices. Computing environment 300 may be comprised of one or more personal computing devices 202, a search application system 306, and cloud search service 308.

Personal computing device 302 may include one or more of any desktop or portable computing device capable of receiving and sending a message over a network, such as network 110, or the like. For example, a personal computing device 302 may be a mobile phone, a desktop computer, a laptop computer, a landline phone, a gaming system, a television, smart accessory, and/or a digital or artificial intelligence enabled personal assistant. Personal computing device 302 may further comprise of a one or more applications, modules, and internal components (e.g. to capture media via a camera, speaker, or microphone and initiate communication). Personal computing devices 302 may include any portable computing device capable of connecting to another computing device and receiving information, as discussed above. Personal computing devices 302 may also be configured to execute at least one native or web-based client application (e.g., a communication application) that is configured to receive communication and/or content from another computing device. In some embodiments, mobile devices (e.g., a mobile phone) may also communicate with non-mobile personal computing services (e.g., a smart speaker or smart home hub), or the like. In one embodiment, such communications may include accessing the internet with or without an application, sending and/or receiving messages or voice/video calls, searching for, viewing, and/or sharing photographs, digital images, audio clips, video clips, or any of a variety of other forms of communications. Personal computing devices 302 may be configured for sending or receiving signals, such as via a wired or wireless network, or may be configured for processing or storing signals, such as in memory as physical memory states, and may, therefore, operate as a server. Network 110 may be configured to couple personal computing devices 302 and their components with components corresponding to the search application system 306. It should be appreciated that any devices or servers of FIG. 3 may be configured to communicate with each other directly, such as through Bluetooth or any other near-field communication (NFC) protocol. Network 110 may include any of a variety of wireless sub-networks that may further overlay stand-alone ad-hoc networks, and the like, to provide an infrastructure-oriented connection for the personal computing devices 302. Personal computing device 302 may be configured to capture digital media (e.g. a digital image) locally, and transmit the digital image to the search application system 306 for analysis by various OCR machine learning techniques. For example, a user device may capture a digital image of a restaurant menu and further transmit the digital image to a server OCR machine learning module 302C. The server OCR machine learning module 302C may then render and transmit a geometrical boundary element comprising machine-encoded text which is representative of the optically recognized text captured in the digital image. The geometrical boundary element comprising the machine-encoded text may then be transmitted to the personal computing device 302 and presented via a graphical user interface in a format wherein the digital image of the menu is now overlaid with the geometrical bounding element comprising machine-encoded text. The personal computing device may additionally provide a graphical user interface tool for selecting machine-encoded text in order to further perform a search to gather additional information regarding the selected machine-encoded text (i.e. one or more menu items). Upon receiving data representative of a portion of the machine-encoded text being selected, the personal computing device 302 may then transmit a search request comprising one or more of a device identifier (e.g. a phone number, device serial number, device IMEI number, IP address, user name, user profile, or the like); determine a location of the user device via a GPS system; and transmit a search request comprising one or more of: the device identifier, determined location, and the query comprising the portion of the machine-encoded text, to the search application system 306. The search application system may then conduct a search based on the received search request and transmit search results back to the personal computing device 302.

Search application system 306 may be comprised of an API gateway 306A, server search engine module 306B, and a server OCR machine learning module 306C. Although not shown, the search application system 306 may further be comprised of one or more databases and servers (communication servers, web servers, application servers, proxy servers, collaboration server, or the like). The search application system 306 may be configured to execute one or more media analysis software modules (not shown) based on instructions and data stored in one or more databases. The databases may be any type of database or memory, and may be configured to be in direct communication with the search application system 206.

The API gateway 306A may be configured to communicate with one or more network components and or server components to manage initial communications for API calls from applications. The API gateway 306A may be further configured to verify that API requests from search requests initiated by personal computing devices 302 meet predetermined policy and security controls for search application system 306. For example, API gateway 306A may be configured to provide instructions for search application system 306 server components to screen requests for malicious input and issue tokens to applications that are used to balance API workloads. API gateway 306A may also receive load/capacity information from devices in communication with the search application system 306, for example, network routers (not shown) and/or load balancers (not shown).

Server OCR machine learning module 306C may be a software module configured to receive various media (e.g., a digital image, audio, or video) captured and/or received by the server search engine module 302B. The server OCR machine learning module 306C may be further configured to label various media, detect and extract objects, barcodes, faces, textual data, on various media (e.g. a digital image, audio, or video). The server OCR machine module 306C may be further configured to implement certain natural language processing techniques, for example: spell checking, keyword search, finding synonyms, extracting information from websites such as: product price, dates, location, people, or company names, classifying: reading level of school texts, positive/negative sentiment of longer documents, machine translation, spoken dialog systems, complex question answering, and translating between languages. In an instance wherein the server OCR machine learning module 306C receives a digital image comprising text, the server OCR machine learning module 306C may optically recognize said text on the digital image and render a geometrical boundary element comprising machine-encoded text which is representative of the optically recognized text. The server OCR machine learning module 306C may then transmit the rendered geometrical boundary comprising the machine-encoded text representative of the optically recognized text to the server search engine module 306B or the personal computing device 302.

Search engine module 306B may be a software module configured to receive various media (e.g., a digital image, audio, or video) captured from a personal computing device 302. In response to receiving a search request, server search engine module 306B may implement several processes based on the instructions received in the search request. For example, upon receiving a device identifier (e.g. a phone number, device serial number, device IMEI number, IP address, user name, user profile, or the like) the server search engine module 306B may then determine the identity of a particular user (e.g. the user's given first and last name, social media user name, email address, or name associated with a billing statement). In response to receiving regarding the location of the user device via a GPS system the sever search engine module 306B may further make a determination that the user device is at particular address associated with a known location (e.g. a landmark, business, restaurant, commercial or personal property) and log the presence of the user device at that location in a database. In response to receiving a search query comprising the portion of the machine-encoded text, the server search engine module 306B may conduct an internal search query for the requested information associated with the selected portion of the machine-encoded text and/or transmit the query to a cloud search service 308. The server search engine module 306B may then transmit search results to the personal computing device.

Figure 4:
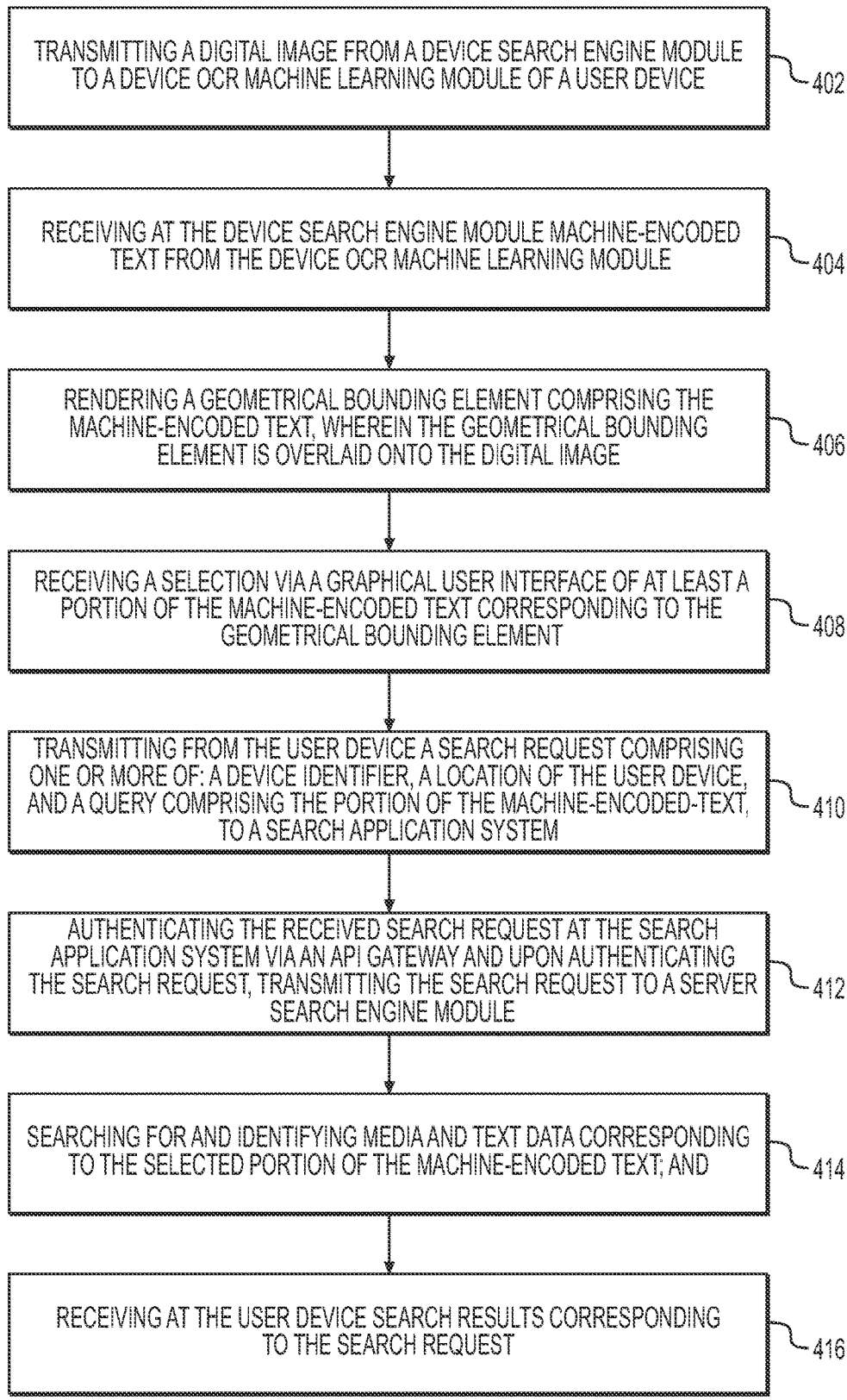
FIG. 4 depicts a flow diagram illustrating steps of a method for generating search result data based on machine-encoded text data generated by optical character recognition machine learning techniques performed on media.

FIG. 4 depicts a flow diagram illustrating steps of a method for generating search result data based on machine-encoded text data generated by optical character recognition machine learning techniques performed on media. In response to a digital image being stored or captured on a user device (i.e., personal computing device 102), a user device may implement a step for transmitting an image from a device search engine module 102A to a device OCR machine learning module 102B of a user device (Step 402). The user device (i.e. personal computing device 102) may then implement a step for receiving at the device search engine module 102A machine-encoded text from the device OCR machine learning module 102B (Step 404). In response to receiving the digital image, the device OCR machine learning module 102B may implement a step for rendering a geometrical bounding element comprising the machine-encoded text, wherein the geometrical bounding element is overlaid onto the image (Step 406). The device OCR machine learning module 102B may then transmit then transmit the rendered geometrical bounding element comprising the machine-encoded text to the device search engine module 102A, wherein the user device (i.e. personal computing device) may implement a step for receiving a selection via a graphical user interface of at least a portion of the machine-encoded text corresponding to the geometrical bounding element (Step 408). For example, a display corresponding to the user device (i.e. personal computing device 102) may display the rendered geometrical boundary element (wherein the geometrical boundary element may be transparent) comprising the machine-encoded text and further display a selection tool that may be utilized to select all or a portion of the machine-encoded text. In one example the digital image may be a picture of a menu and the machine-encoded text may represent text that appeared the menu. In response to receiving an indication of a selection of the machine-encoded text, the device search engine module 102A may implement a step for transmitting from the user device a search request comprising one or more of: a device identifier, a location of the user device, and a query comprising the portion of the machine-encoded-text, to a search application system (Step 410). Upon receiving the search request, the search application system 106 may implement a step for authenticating the received search request at the search application system via an API gateway and upon authenticating the search request, transmitting the search request to a server search engine module (Step 412). The search application system 106 may then implement a step for searching for and identifying media and text data corresponding to the selected portion of the machine-encoded text (Step 414). For example, the search application system 106 may conduct a search using local computing resources and/or submit queries to external data server(s) 104 and/or a cloud search service 208. In response to receiving search results the search application system 106 may implement a step for receiving at the user device (i.e. personal computing device 102) search results corresponding to the search request.

Figure 5:
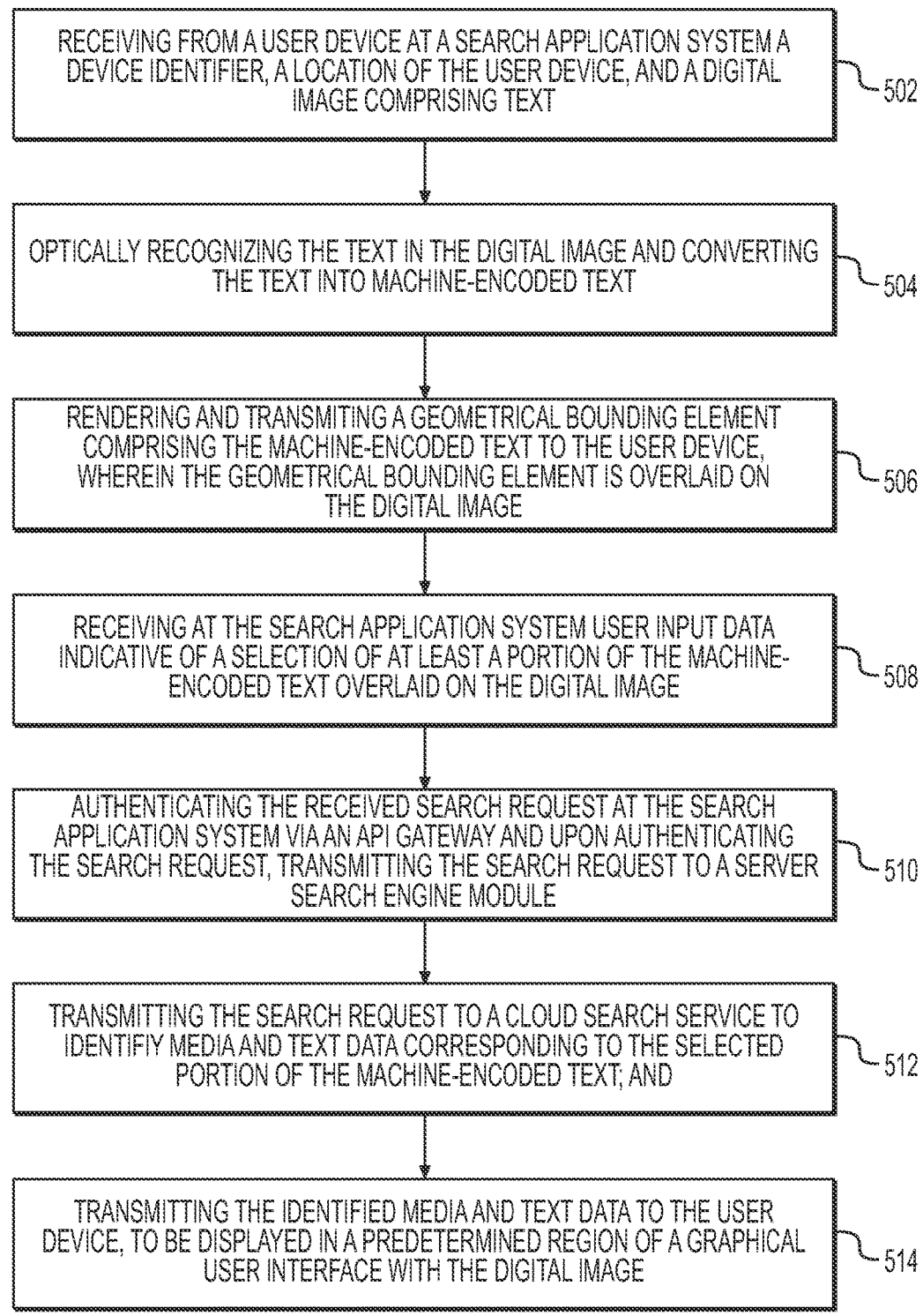
FIG. 5 depicts a flow diagram illustrating alternative steps of a method for generating search result data based on machine-encoded text data generated by optical character recognition machine learning techniques performed on media.

FIG. 5 depicts a flow diagram illustrating alternative steps of a method for generating search result data based on machine-encoded text data generated by optical character recognition machine learning techniques performed on media. In response to a digital image being stored or captured on a user device (i.e. personal computing device 102), a user device may implement a step for receiving from the user device at a search application system a device identifier, a location of the user device, and a digital image comprising text (Step 502). For example, a user may take a picture of a menu that lists menu items in a foreign language and in order to translate that menu and gain additional information (e.g. a picture and/or a description) regarding the menu items, the user may initiate a search based on digital image of the menu. The search application system may then implement a step for optically recognizing the text in the digital image and converting the text into machine-encoded text via a server OCR machine learning module 106C (Step 504). In response to optically recognizing the digital image, the server OCR machine learning module may implement a step for rendering and transmitting a geometrical bounding element comprising the machine-encoded text to the user device, wherein the geometrical bounding element is overlaid on the digital image (Step 506). The search application system 106 may then transmit the geometrical bounding element comprising the machine-encoded text to the user device (i.e. personal computing device 102) and in response to receiving the geometrical boundary element comprising the machine-encoded text, the user device (i.e. personal computing device 102) may implement steps for receiving at the search application system 106 user input data indicative of a selection of at least a portion of the machine-encoded text overlaid on the second digital image (Step 508). The search application system 106 may then initiate instructions for authenticating the received search request at the search application system via an API gateway and upon authenticating the search request, transmitting the search request to a server search engine module 106B (Step 510). For example, the search application system 106 via the API gateway may authenticate the received search request identifying a token transmitted with the search request, authenticating credentials transmitted with the search request, and/or confirm and identity of a user or user device transmitted with the search request. Additionally, while the search application system 106 may conduct an internal search and leverage local computing resources to search the internet, the search application system 106 may also implement steps for transmitting the search request to a cloud search service to identify media and text data corresponding to the selected portion of the machine-encoded text (Step 512). For example, the search application system 106 may submit a search query to one or more third party search engine services to retrieve information (i.e. media and text) regarding the search request. In response to retrieving or receiving search results the search application system 106 may implement steps for transmitting the identified media and text data to the user device (i.e. personal computing device), to be displayed in a predetermined region of a graphical user interface with the digital image (Step 514). For example, the search application system 106 may transmit the search results to the user device 102 wherein the user device (i.e. personal computing device) may determine the orientation of the display (e.g. whether content is being displayed horizontally or vertically, and/or whether the selected machine-encoded text is still visible) and upon receipt of the search results, display the search results in a predetermined based on the orientation determination.

Figure 6:
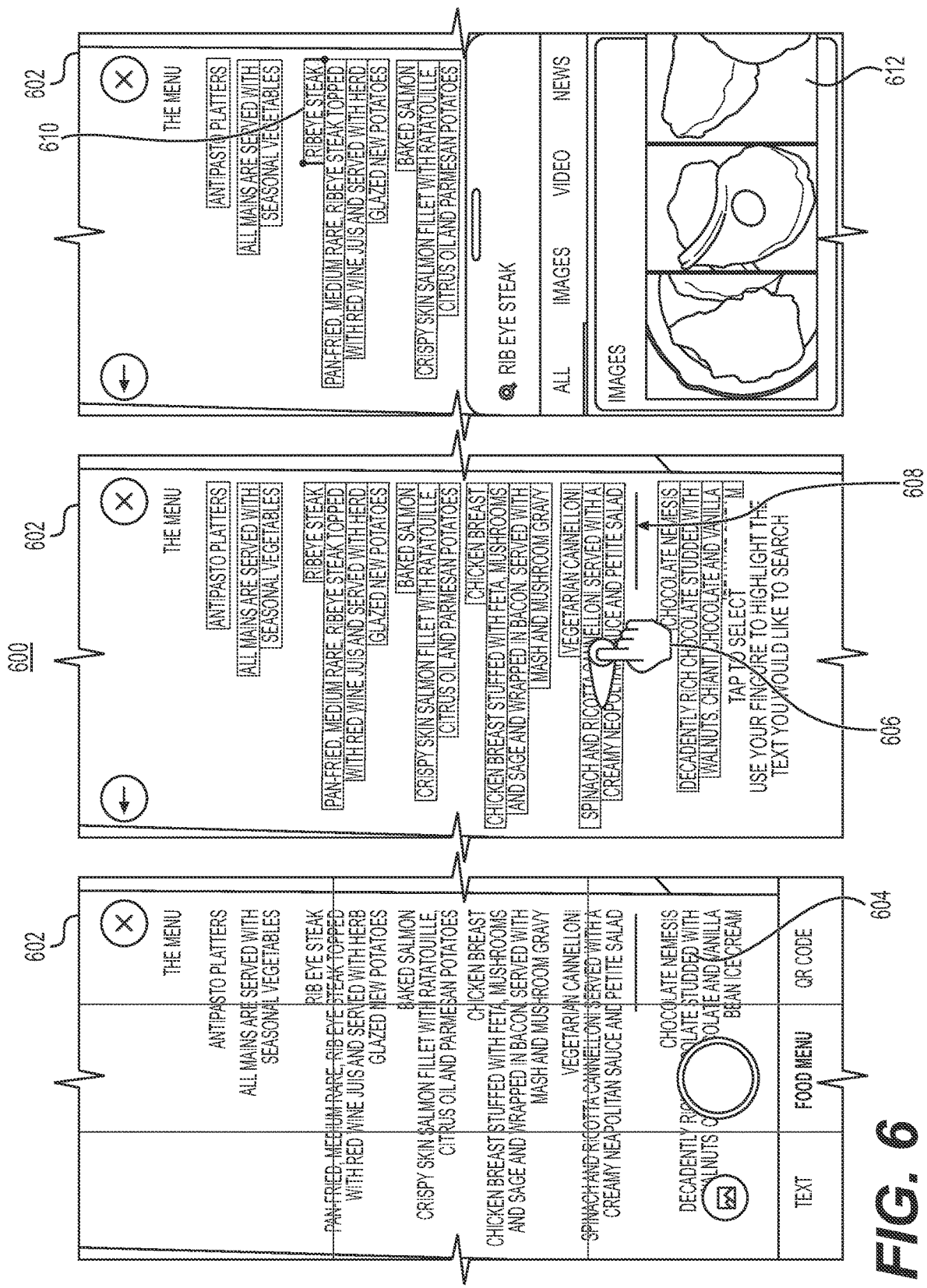
FIG. 6 depicts a graphical user interface for generating search result data based on machine-encoded text data generated by optical character recognition machine learning techniques performed on media.

FIG. 6 depicts a graphical user interface for generating search result data based on machine-encoded text data generated by optical character recognition machine learning techniques performed on media. Graphical user interface environment 600 may be a standalone application or a feature of an application on a personal computing device 102. Graphical user interface environment 600 may be comprised of a graphical user interface (GUI) 602 for capturing digital media. For example, GUI 602 may be configured for capturing digital media 604: video, digital audio, and static/live digital images, in conjunction with one or more components of a personal computing device 102. For example, the search engine module 106B may detect a new picture in a user device (i.e. personal computing device 102) camera roll or the search engine module 106B may provide a graphical user interface 602 for capturing an image within an application. The digital media 604 may additional comprise of multiple frames, layers, and/or pages. GUI 602 may be comprised of static or dynamic regions for displaying content and further present user tools for interacting with an application, manipulating media, and/or making a selection. For example, GUI 602 may capture digital media 604, wherein the digital media 604 may be a digital image of a menu comprising text representative of menu items. As disclosed above, the digital media 604 (e.g. the digital image) may be transmitted to a device OCR module or server OCR module wherein the digital media is analyzed and a geometrical boundary element comprising machine-encoded text 608 is rendered and transmitted back to the user device (i.e. personal computing device 102) to be displayed overlaid with the digital media (e.g. digital image). When the geometrical boundary element comprising machine encoded-text 608 is displayed, the geometrical boundary may or may not be visible. The device OCR machine learning module 102B or the server OCR machine learning module 106C may be configured to determine the composition of the digital media (e.g. image) and render a visible or transparent geometrical boundary element based on the format of the digital media (e.g. video, audio, static/live image), the color scheme of the digital image, the type or number objects in the digital image, the amount of text in the digital image (e.g. text covers seventy percent of the digital image), and the human perceivable language (e.g. English) the operating system uses to present text to a user on the user device (i.e. personal computing device 102) in comparison to the human perceivable language detected on the digital media 604 (e.g. image). The color, font, language and format of the machine-encoded text may also be rendered based on the format of the digital media (e.g. video, audio, static/live image), the color scheme of the digital image, the type or number objects in the digital image, the amount of text in the digital image exceeding a threshold (e.g. text covers seventy percent of the digital image), and the human perceivable language (e.g. English) the operating system uses to present text to a user on the user device (i.e. personal computing device 102) in comparison to the human perceivable language detected on the digital media 604 (e.g. image). A graphical user interface tool 606 may be presented in graphical user environment 600. The graphical user interface selection tool 606 may be configured for selecting machine-encoded text and manipulating/interacting with the digital media 604. The selected machine-encoded text 610 may additionally be formatted locally on the user device (i.e. personal computing device 102) or by the search application system 106. The selected portion of the machine-encoded text 610 may be formatted by visually making it different from the non-selected machine-encoded text, for example by highlighting the text, italicizing, bolding, underlining, or translating, and/or appearing in a color contrasting from the background of the digital media 604 or non-selected machine-encoded text. Upon receiving search results 612 corresponding to the selected portion of the selected portion of the machine-encoded text 610 from the search application system 106, the search results 612 may be presented overlaid with the digital media 604 (e.g. menu). The search results 612 may any form of media, for example: digital audio, digital video, text, and/or digital static/live images. The search results 612 may represent ranked (e.g. according to relevance or time) content search engines associated with the subject matter or text corresponding to the selected portion of the machine-encoded text 610. The search results 612 may additionally be news, social media content, or entertainment media related to the selected portion of the machine-encoded text 610. The search results 612 may also be an enhanced digital menu or enhanced profile; for example, the search application system 106 may store and log all images and search requests corresponding to a known location (e.g. a business, restaurant, and/or entertainment venue) and digital media 604 (e.g. digital images of menus) captured at the known location in order to generate an enhanced menu comprising search results 612 representative of text identified as menu items from the captured digital media 604. The graphical user interface environment 600 generally or the search results 612 specifically, may be further configured to display digital alerts (e.g. recommendations, endorsements, or rewards) or rich cards. For example, the based on the search request corresponding to the selected portion of the machine-encoded text 610, the search results 612 may include a digital alert regarding subject matter corresponding to the selected portion of the machine-encoded text 610 or a known location (e.g. business, restaurant, and/or entertainment venue). Additionally, generated search results 612 may tracked and logged over time for a user device or a known location in order to generate rich cards for the known location.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described below with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer to alter its function as detailed herein, a special purpose computer, ASIC, or other programmable data processing apparatus, such that the instructions, which execute via the processor of the computer or other programmable data processing apparatus, implement the functions/acts specified in the block diagrams or operational block or blocks. In some alternate implementations, the functions/ acts noted in the blocks can occur out of the order noted in the operational illustrations. For example, two blocks shown in succession can in fact be executed substantially concurrently or the blocks can sometimes be executed in the reverse order, depending upon the functionality/acts involved.

For the purposes of this disclosure, a non-transitory computer readable medium (or computer-readable storage medium/media) stores computer data, which data can include computer program code (or computer-executable instructions) that is executable by a computer, in machine-readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, cloud storage, magnetic cassettes, magnetic tape, magnetic disk storage or other magnetic storage devices, or any other physical or material medium which can be used to tangibly store the desired information or data or instructions and which can be accessed by a computer or processor.

For the purposes of this disclosure, the term "server" should be understood to refer to a service point that provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software, for example virtual servers, and one or more database systems and application software that support the services provided by the server. Cloud servers are examples.

For the purposes of this disclosure, a "network" should be understood to refer to a network that may couple devices so that communications may be exchanged, such as between a server and a personal computing device or other types of devices, including between wireless devices coupled via a wireless network, for example. A network may also include mass storage, such as network attached storage (NAS), a storage area network (SAN), a content delivery network (CDN) or other forms of computer or machine-readable media, for example. A network may include the Internet, one or more local area networks (LANs), one or more wide area networks (WANs), wire-line type connections, wireless type connections, cellular or any combination thereof. Likewise, sub-networks, which may employ differing architectures or may be compliant or compatible with differing protocols, may intemperate within a larger network.

For purposes of this disclosure, a "wireless network" should be understood to couple personal computing devices with a network. A wireless network may employ stand-alone ad-hoc networks, mesh networks, Wireless LAN (WLAN) networks, cellular networks, or the like. A wireless network may further employ a plurality of network access technologies, including Wi-Fi, Long Term Evolution (LTE), WLAN, Wireless Router (WR) mesh, or 2nd, 3rd, 4th or 5th generation (2G, 3G, 4G or 5G) cellular technology, Bluetooth, 802.IIb/g/n, or the like. Network access technologies may enable wide area coverage for devices, such as personal computing devices with varying degrees of mobility, for example.

In short, a wireless network may include any type of wireless communication mechanism by which signals may be communicated between devices, such as a personal computing device or a computing device, between or within a network, or the like.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

For purposes of this disclosure, a personal computing device may include a computing device capable of sending or receiving signals, such as via a wired or a wireless network. A personal computing device may, for example, include a desktop computer or a portable device, such as a cellular telephone, a smart phone, a display pager, a radio frequency (RF) device, an infrared (IR) device an Near Field Communication (NFC) device, a Personal Digital Assistant (PDA), a handheld computer, a tablet computer, a phablet, a laptop computer, a set top box, a wearable computer, smart watch, an integrated or distributed device combining various features, such as features of the forgoing devices, or the like.

A personal computing device may vary in terms of capabilities or features. Claimed subject matter is intended to cover a wide range of potential variations, such as a web-enabled personal computing device or previously mentioned devices may include a high-resolution screen (HD or 4K for example), one or more physical or virtual keyboards, mass storage, one or more accelerometers, one or more gyroscopes, global positioning system (GPS) or other location-identifying type capability, or a display with a high degree of functionality, such as a touch-sensitive color 2D or 3D display and components for displaying augmented reality objects, for example.

A personal computing device may include or may execute a variety of possible applications, such as a client software application enabling communication with other devices. A personal computing device may also include or execute an application to communicate content, such as, for example, textual content, multimedia content, or the like. A personal computing device may also include or execute an application to perform a variety of possible tasks, such as: browsing, searching, connecting to a network (e.g. the internet), receiving communications (e.g. phone call, emails, text messages, social media communications), streaming or displaying various forms of content, including locally stored or uploaded images and/or video, or games (such as live video calls).

What is claimed is:

1. A computer-implemented method comprising:
   receiving, from a user device an image comprising text;
   converting the text into machine-encoded text;
   rendering a geometrical bounding element comprising the machine-encoded text;
   receiving, from the user device, a search request comprising a selection of at least a portion of the machine-encoded text corresponding to the geometrical bounding element;

identifying media and text data corresponding to the selected portion of the machine encoded text; and transmitting, to the user device, the identified media and text data to the user device.

2. The computer-implemented method of claim 1, further comprising:

automatically determining a location of the user device based on GPS coordinates or identifying a name of the location from object data or text data in the image.

3. The computer-implemented method of claim 1, wherein rendering a geometrical bounding element comprising the machine-encoded text, further comprises:

analyzing text in the image by conducting natural language processing techniques on the analyzed text.

4. The computer-implemented method of claim 1, wherein rendering a geometrical bounding element comprising the machine-encoded text, further comprises:

generating an enhanced location profile based on a determined location and search results corresponding to the search request.

5. The computer-implemented method of claim 1, further comprising:

determining whether the geometrical bounding element is rendered visible or transparent based on a determination of an amount of text in the image.

6. The computer-implemented method of claim 1, further comprising:

authenticating the received search request via an API gateway; and determining whether the search request comprises an authentication token.

7. The computer-implemented method of claim 1, wherein transmitting to the user device, search results corresponding to the search request further comprises:

displaying search results comprising content ranked according to relevance associated with subject matter or text corresponding to the selected portion of the machine-encoded text.

8. A system comprising:

a memory storage device storing instructions for generating search result data based on machine-encoded text data; and one or more processors configured to execute the instructions for generating search result data based on machine-encoded text data by performing the steps of:

receiving, from a user device an image comprising text;

converting the text into machine-encoded text;

rendering a geometrical bounding element comprising the machine-encoded text;

receiving, from the user device, a search request comprising a selection of at least a portion of the machine-encoded text corresponding to the geometrical bounding element;

identifying media and text data corresponding to the selected portion of the machine encoded text; and transmitting, to the user device, the identified media and text data to the user device.

9. The system of claim 8, wherein the processor is further configured to execute the instructions to perform one more additional steps comprising:

automatically determining a location of the user device based on GPS coordinates or identifying a name of the location from object data or text data in the image.

10. The system of claim 8, wherein rendering a geometrical bounding element comprising the machine-encoded text, further comprises:

analyzing text in the image by conducting natural language processing techniques on the analyzed text.

11. The system of claim 8, wherein rendering a geometrical bounding element comprising the machine-encoded text, further comprises:

generating an enhanced location profile based on a determined location and search results corresponding to the search request.

12. The system of claim 8, wherein the processor is further configured to execute the instructions to perform one more additional steps comprising:

determining whether the geometrical bounding element is rendered visible or transparent based on a determination of an amount of text in the image.

13. The system of claim 8, wherein the processor is further configured for authenticating the received search request via an API gateway by determining whether the search request comprises an authentication token.

14. The system of claim 8, wherein receiving at the user device search results corresponding to the search request further comprises:

displaying search results comprising content ranked according to relevance associated with subject matter or text corresponding to the selected portion of the machine-encoded text.

15. A non-transitory computer-readable medium for generating search result data based on machine-encoded text data, the method comprising:

at least one storage medium with instructions thereon for generating search result data based on machine-encoded text data; and at least one processor that executes the instructions to perform a method comprising:

receiving, from a user device an image comprising text;

converting the text into machine-encoded text;

rendering a geometrical bounding element comprising the machine-encoded text;

receiving, from the user device, a search request comprising a selection of at least a portion of the machine-encoded text corresponding to the geometrical bounding element;

identifying media and text data corresponding to the selected portion of the machine encoded text; and transmitting, to the user device, the identified media and text data to the user device.

16. The non-transitory computer-readable medium of claim 15, further comprising:

automatically determining a location of the user device based on GPS coordinates or identifying a name of the location from object data or text data in the image.

17. The non-transitory computer-readable medium of claim 15, wherein rendering a geometrical bounding element comprising the machine-encoded text, further comprises:

analyzing text in the image by conducting natural language processing techniques on the analyzed text.

18. The non-transitory computer-readable medium of claim 15, wherein rendering a geometrical bounding element comprising the machine-encoded text, further comprises:

generating an enhanced location profile based on a determined location and search results corresponding to the search request.

19. The non-transitory computer-readable medium of claim 15, further comprising:

determining whether the geometrical bounding element is rendered visible or transparent based on a determination of an amount of text in the image.

20. The non-transitory computer-readable medium of claim 15, further comprising:
   authenticating the received search request via an API gateway; and
determining whether the search request comprises an authentication token.

* * * * *